United States Patent [19]

Ulug

[11] Patent Number: 5,408,588
[45] Date of Patent: Apr. 18, 1995

[54] ARTIFICIAL NEURAL NETWORK METHOD AND ARCHITECTURE

[76] Inventor: Mehmet E. Ulug, 1537 E. Hillsboro Blvd., #342, Deerfield, Fla. 33441

[21] Appl. No.: 63,370

[22] Filed: May 18, 1993

Related U.S. Application Data

[63] Continuation of Ser. No. 710,961, Jun. 6, 1991, abandoned.

[51] Int. Cl.$^6$ .............................................. G06F 15/18
[52] U.S. Cl. ...................................... 395/23; 395/24; 395/27
[58] Field of Search ........................... 395/24, 23, 27

[56] References Cited

U.S. PATENT DOCUMENTS

| | | | |
|---|---|---|---|
| 4,317,197 | 2/1982 | Ulug | 370/94 |
| 4,858,147 | 8/1989 | Conwell | 364/513 |
| 4,906,940 | 3/1990 | Greene et al. | 382/16 |
| 4,912,652 | 3/1990 | Wood | 364/513 |
| 4,918,620 | 4/1990 | Ulug | 364/513 |
| 4,933,872 | 6/1990 | Vandenberg et al. | 395/22 |
| 4,941,122 | 7/1990 | Weideman | 364/807 |
| 4,965,443 | 10/1990 | Yamasaki et al. | 395/11 |
| 4,979,126 | 12/1990 | Pao et al. | 395/24 |
| 5,033,006 | 7/1991 | Ishizuka et al. | 364/513 |
| 5,050,096 | 9/1991 | Seidman | 395/22 |
| 5,073,867 | 12/1991 | Murphy et al. | 395/27 |
| 5,101,361 | 3/1992 | Eberhardt | 395/24 |
| 5,195,169 | 3/1993 | Kamiya et al. | 395/23 |
| 5,216,746 | 6/1993 | Yoshizawa et al. | 395/24 |
| 5,265,224 | 11/1993 | Maruno | 395/24 |

OTHER PUBLICATIONS

Bailey et al, "Why VLSI Implementations of Associative VLCNs Require Connection Multiplexing", IEEE, 1988, 112-119.
Lippmann, R. P., "Pattern Classification Using Neural Networks", IEEE Comm. Magazine, Nov. 1989, 47-64.
Jones et al., "Function Approximation and Time Series Prediction with Neural Networks", IJCNN, Jun. 1990, I-649 to I-665.
Quan et al, "Function Approximation With an Orthogonal Basis Net", IJCNN, Jun. 1990, III-605 to III-619.
Rumelhart et al, "Learning Internal Representations by Error Propagation," Parallel Distributed Processing, vol. 1, Foundations, Rumelhart and McClelland, eds, MIT Press, Cambridge, Mass. (1986), pp. 318-362.
Thro, Ellen, The Artificial Intelligence Dictionary, 1991, p. 148, Microtrend Books.
Omatu et al, "Neural Network Model for Alphabetical Letter Recognition," International Neural Network Conference, Jul., 1990, pp. 19-22.
LeCun et al, "Optical Character Recognition and Neural-Net Chips," International Neural Network Conference, Jul. 1990, pp. 651-655.

*Primary Examiner*—Robert W. Downs
*Attorney, Agent, or Firm*—Malin, Haley, DiMaggio & Crosby

[57] ABSTRACT

An architecture and data processing method for a neural network that can approximate any mapping function between the input and output vectors without the use of hidden layers. The data processing is done at the sibling nodes (second row). It is based on the orthogonal expansion of the functions that map the input vector to the output vector. Because the nodes of the second row are simply data processing stations, they remain passive during training. As a result the system is basically a single-layer linear network with a filter at its entrance. Because of this it is free from the problems of local minima. The invention also includes a method that reduces the sum of the square of errors over all the output nodes to zero (0.000000) in fewer than ten cycles. This is done by initialization of the synaptic links with the coefficients of the orthogonal expansion. This feature makes it possible to design a computer chip which can perform the training process in real time. Similarly, the ability to train in real time allows the system to retrain itself and improve its performance while executing its normal testing functions.

38 Claims, 4 Drawing Sheets

ARTIFICIAL NEURAL NETWORK METHOD AND ARCHITECTURE

This is a continuation of application Ser. No. 07/710,961, filed on Jun. 6, 1991, now abandoned.

The present invention is directed in general to Artificial Neural Networks and, more particularly, to a neural network architecture and corresponding method of operation.

BACKGROUND OF THE INVENTION

Computers can store, modify, and retrieve large amounts of data much more quickly than humans. They are also much more accurate and precise in their computations and less prone to error than most conscientious human beings. However, computers cannot cope with many of the simple tasks that humans perform every day. In particular, they completely fail in generalizing and guessing. Also they have great difficulty working with either partial or noisy information. For this reason scientists have designed parallel distributed processors that consist of a vast network of neuron-like units. These systems are called Artificial Neural Networks. Although they could be built in hardware, typically they are simulated on powerful conventional computers.

The simplest neural network contains an input layer and an output layer. Each layer consists of a row of neuron-like units, or nodes. Each node in the output layer is connected to every node in the input layer through synaptic links. The conductivities of these links are called "weights". In such a network the signal at an output node is computed by summing up the product of each input signal with the weight of the corresponding synaptic link connecting to this output node. The output signals, called "activations", are then compared with the "target" values (desired signals) assigned to these nodes. A portion of the error, i.e., the difference between the signal of an output node and the target value assigned to this output node, is used to change the weights in order to reduce the error. The most commonly used method of error minimization is called the "delta rule".

In effect, a neural network generates its output vector (a collection of activations of the output nodes) from an input vector (a collection of input signals) and compares the output vector with the target vector (a collection of desired outputs). This process is called "learning". If the output and target vectors are identical, no learning takes place. Otherwise the weights are changed to reduce the error. A neural network learns a mapping function between the input and target vectors by repeatedly observing patterns from a training set and modifying the weights of its synaptic links. Each pass through the training set is called a "cycle". Typically, a learning process (also called "training") consists of many thousands of cycles, and takes from several minutes to several hours to execute on a digital computer.

What is described above is the well known learning paradigm called "pattern association". In this paradigm the task is to associate a set of input patterns with an output pattern. A set of input patterns can be, for example, a number of curves that belong to the same class while differing from each other. Another learning paradigm is the "auto association" in which an input pattern is associated with itself. The goal here is pattern completion. When an incomplete pattern is presented, the auto associator restores it to its original form. In both paradigms a teaching input in the form of repetitive presentations of a number of sets of input patterns associated with a number of output patterns is required. This is called "supervised learning".

It is found that the simple neural networks consisting of a row of input nodes and row of output nodes (also described as a "single-layer" network) cannot learn mappings that have very different outputs from very similar inputs. For example, they cannot learn based on the exclusive-or function. It is found that for the neural network to learn such arbitrary patterns, they must have more than two rows of nodes. In such "multi-layer" networks the rows between the input and output layers are called "hidden layers". The most commonly used multi-layer neural networks are known as the "backpropagation" systems. In these networks learning takes place by the propagation of error in the forward as well as the backward direction. This two way propagation of errors results in a complex learning process and further increases the training time. It was also discovered that linear networks cannot compute more in multiple layers than they can in a single layer. Because of this, in backpropagation networks nonlinearities are introduced at the hidden and output nodes using sigmoid functions.

In a single-layer linear network the error function is always smooth and the error surface is bowl-shaped. The delta rule mentioned above uses the "gradient descent" method. In this method the derivative of the error measure (sum of the squares of errors) with respect to each weight is proportional to the weight change with a negative constant of proportionality (proportion of the dictated weight change is called "learning rate"). This corresponds to performing the steepest descent on a surface in weight space. The height of the surface at any point is equal to the error measure. Because of this, the delta rule has no difficulty locating the minimum point of the bowl-shape error surface of a single-layer linear network. Multi-layer networks, however, can have more complex error surfaces with many minima. Only one of these is the "global minima" in which the system reaches an errorless state. The others are called "local minima". As a result, there is real possibility of a multi-layer network getting "stuck" in a local minima.

To reduce the training time, the learning rate is set as high as possible. However, this causes the error measure to oscillate. A "momentum term" is added to the weight change equation so that a high learning rate can be used while avoiding oscillations. The coefficient of the momentum term determines what portion of the previous weight change will be added to the current weight change.

In what follows, sets of patterns, features, curves, hyper surfaces and objects will be referred to as "patterns" and functions of the neural network such as identification, classification, detection, pattern association or auto association will be referred to as "identification".

A detailed description of artificial neural networks is provided in the reference entitled "Parallel Distributed Processing" by Rumelhart et al. (1986), Vol. 1, the MIT Press, Cambridge, Mass.

During the evolution of artificial neural networks the following three problems have been discovered:

(i) Single-layer networks cannot learn mappings that have very different outputs from very similar inputs.

(ii) Linear networks cannot compute more in multiple layers than they can in a single layer.

(iii) Multilayer nonlinear networks that use the delta rule suffer from the problems of local minima.

It is a principal object of the present invention to provide a neural network architecture and operating method that is not subject to the aforementioned problems and disadvantages.

It is an additional object of the present invention to provide an architecture and operating method that enables a neural network to:

(i) map any input vector to any output vector without the use of hidden layers;

(ii) be free from the problems of local minima;

(iii) reduce the sum of the square of errors over the output nodes to 0.000000 in fewer than ten cycles.

While the specification concludes with claims defining the features of the invention that are regarded as novel, it is believed that the invention, together with further objects thereof, will be better understood from a consideration of the following description in conjunction with the drawing figures.

DESCRIPTION OF THE PREFERRED EMBODIMENT

This invention is comprised of the architecture and method of operation of a system called Orthogonal Neural Networks (abbreviated as ONN's).

Figure 1:
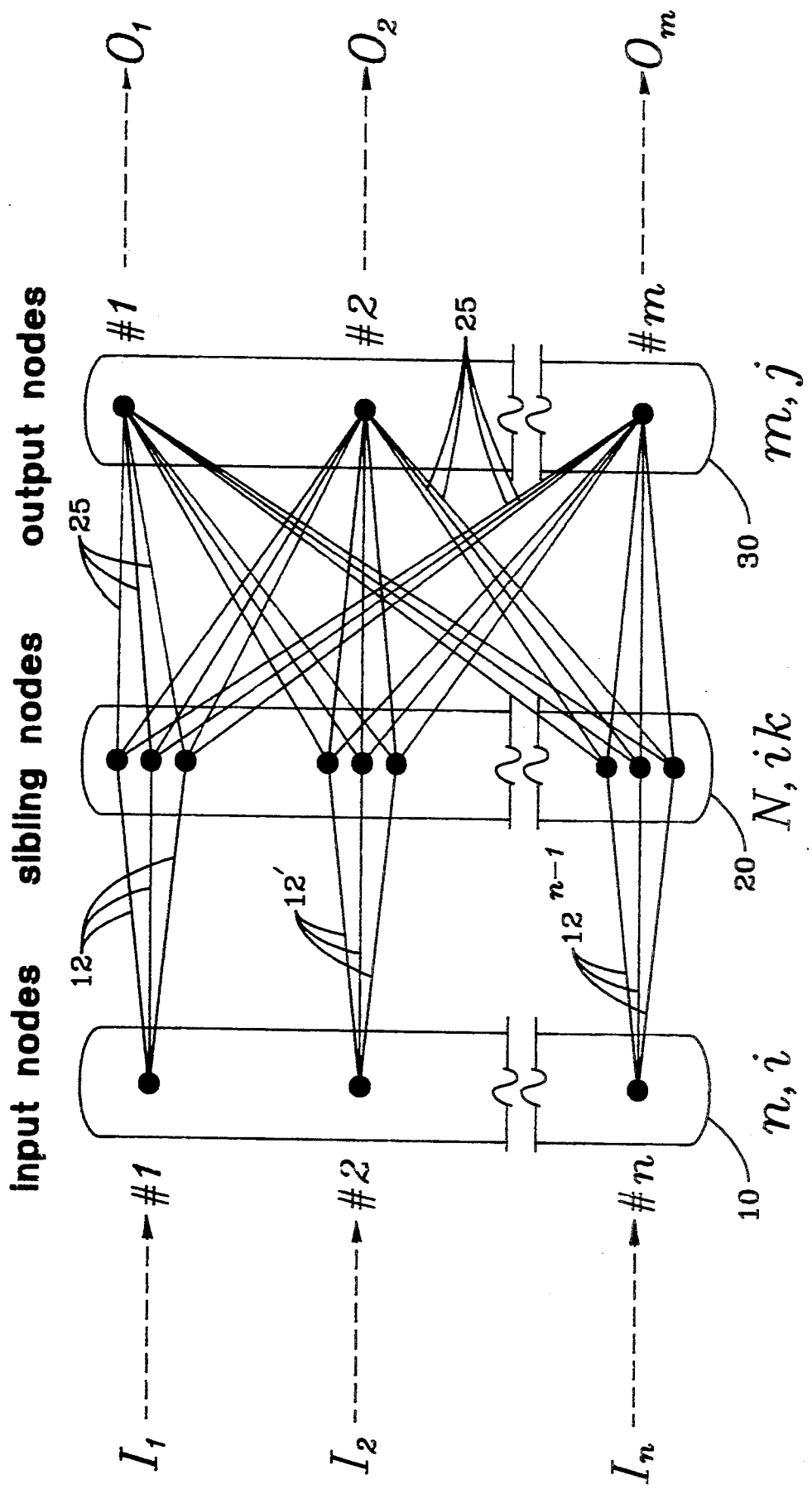
FIG. 1 is a diagrammatic illustration of the artificial neural network architecture of an embodiment of the present invention.

The architecture illustrated in FIG. 1 consists of three sets of nodes, input 10, sibling 20, and output nodes 30. The input nodes 10 and output nodes 30 are neuron-like units. The sibling nodes 20 are neural subsystems made up of many neurons. These nodes house special functions that carry out the orthogonal expansion of the mapping function between input and output vectors I and O, respectively. There are n input nodes 10. FIG. 1 shows the first, second and the n'th input node. Each input node 10 branches out into N sibling nodes 20 through first synaptic link 12, 12', etc. the conductivity, or weight, of which remains fixed at unity during the training process. Note that in FIG. 1, N=3. As a result of this branching out there are, (n.N) sibling nodes. Also there are m output nodes. FIG. 1 shows the first, second and the m'th output node. Each output node 30 is connected to every sibling node through second synaptic link 25, the conductivity, or weight, of which changes during the training process to reduce the difference between the actual and desired outputs at these output nodes 30.

Figure 2:
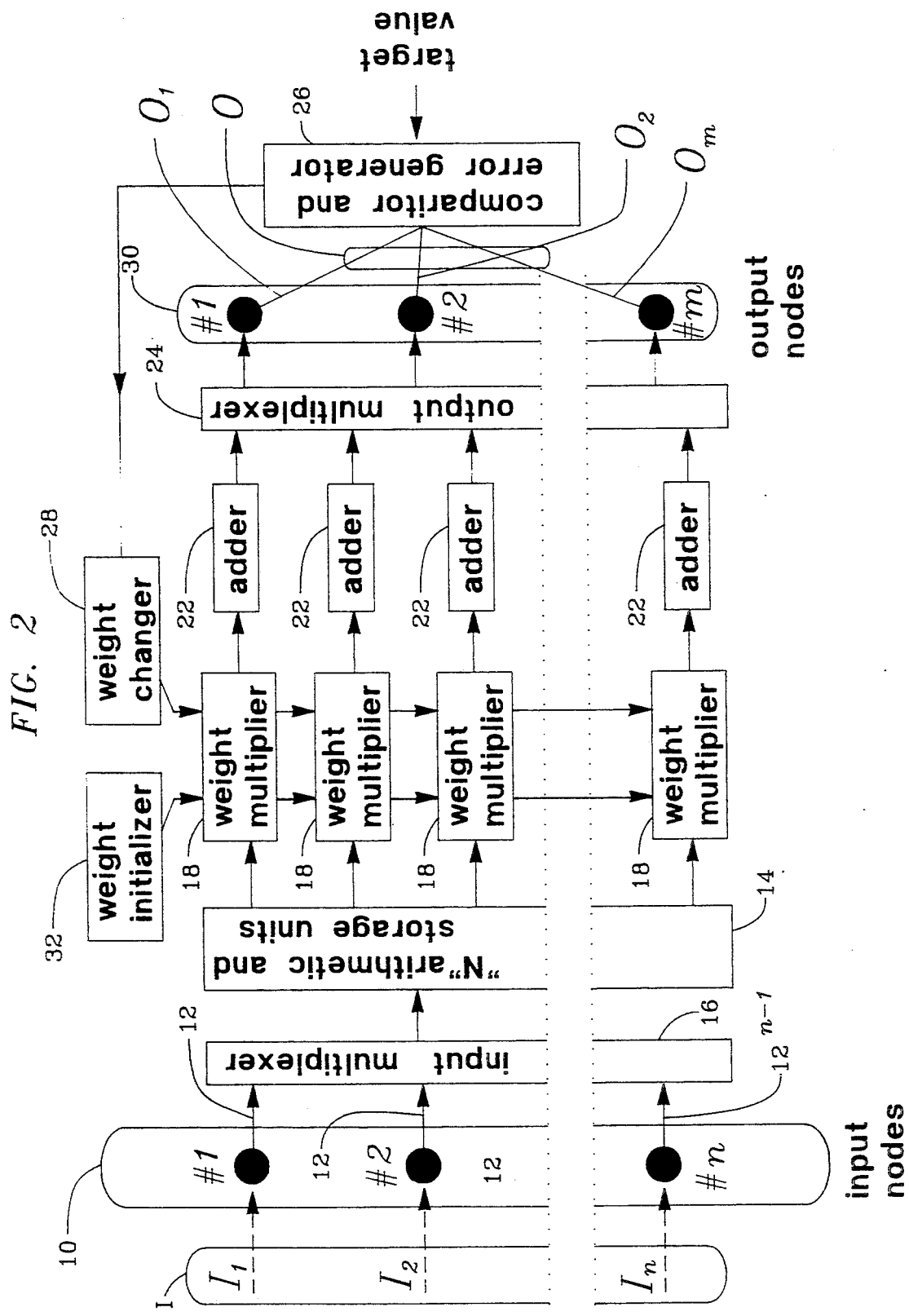
FIG. 2 is a block diagram illustrating the artificial neural network architecture of the invention to be implemented either on hardware or on a computer chip.

In FIG. 2, a subsystem comprising N arithmetic and N storage units 14, which corresponds to sibling nodes 20 of FIG. 1, or which may be a single arithmetic and storage unit 14, is connected to input nodes 10 through a multiplexer unit 16. There are N outputs 12 through $12^{n-1}$ of the arithmetic units. These are connected to "N weight multipliers 18". The outputs of the weight multipliers are connected to the adder 22. The output of the adder 22 is connected through a multiplexer 24 to m output nodes 30. The output nodes are connected to a comparitor and error generator 26 where the activations are compared with the target values and an error signal is generated. The output of the comparitor is connected to a weight changer 28 that determines how much a particular weight is to be changed to minimize the error. The output of the weight changer is fed into the weight multiplier 18. Also a weight initializer unit 32 is connected to the weight multiplier 18 for the purposes of setting the initial values of the weights.

An ONN consists of three layers of nodes, input 10, sibling 20, and output 30. As shown in FIG. 1 each input node branches out into N sibling nodes. The sibling nodes are assumed to be neural subsystems made up of many neurons. In these nodes a set of either orthogonal functions or orthogonal polynomials are applied to the incoming data. This data processing is based on the orthogonal expansion of the mapping functions between input and output vectors. Because of this processing, the ONN can approximate any mapping function between the input and output vectors without the use of hidden layers.

In training, two different versions of the delta rule were used. In one version the target value of 0.5 was used for all output nodes. These nodes were, in effect, decoupled from each other. Using this approach it is quite easy to add another output node to the system while the system is in operation. In the other version of the delta rule that was used, each input vector was mapped to a different output vector. In both versions the sum of the squared errors over the output nodes became 0.000000 in fewer than ten cycles.

It is well known that if a single layer linear network is trained using the gradient descent procedure, its error surface is bowl-shaped. In the ONN the weight of the links between the input and sibling nodes remains fixed at unity. Because of this the sibling nodes can be regarded as data processing stations that do not actively participate in training. If one looks at the sibling nodes as a filter placed at the entrance, one can consider the ONN as a single layer linear neural network. In such networks the problems of local minima do not occur because the error surface has only one minimum. Note that the aforementioned filter does not change its input function, it just expresses it in an expanded form.

It has been discovered that in applications where the components of the input vector have equally spaced values, the initialization of the synaptic links with the coefficients of the orthogonal expansion results in a dramatic reduction of the training time. This technique and method, called Coefficient Initialization, is then extended to all applications using a general method. It is believed that a computer chip designed to implement this method in an ONN could result in real-time training.

The ONN has n input, m output, and (n.N) sibling nodes 20. Recall that each input node 10 branches out into N sibling nodes 20 as shown in FIG. 1. The index i for the input nodes 10 and the index j for the output nodes 30 is used. For the sibling nodes 20 the index is ik, where k varies from 1 to N and i is the index of the input nodes. Using this notation the operation of the ONN can be expressed as follows (vectors, bold lowercase letters; matrices, bold uppercase letters):

$$y = W_s s \qquad (1)$$

where $W_s$ = weight matrix of connections between sibling and output nodes
$s$ = sibling vector
$y$ = output vector The components of the sibling vector s is given as follows:

$$s_{ik} = \phi_k(x_i) \qquad (2)$$

where $x$ = input vector
$\phi_k$ = an orthogonal function that operates on the input vector
$N$ = number of sibling nodes used for each input node Because the ONN's use either orthogonal functions or orthogonal polynomials a brief background on orthogonal functions will now be provided. A detailed description of orthogonal functions is provided in the reference entitled "Theory and Problems of Advanced Calculus", Spiegel (1962), M. R., pp 301-320, McGraw-Hill Book Company, New York, N.Y.

Although we are discussing the orthogonal functions here, orthogonal polynomials or any other suitable method for expanding a function into a convergent series can be used.

Consider a set of functions $\phi_k(x)$ where $k = 1, 2, 3, \ldots$ having the property $$\int_a^b \phi_m(x) \cdot \phi_n(x) \cdot dx = 0 \qquad (3)$$

for the values of $m \neq n$ in some interval (a,b).

In such a case, every member of the set is said to be orthogonal to every other member of the set, and such a set of functions is called orthogonal. If the members of the set have the following additional property $$\int_a^b (\phi_k(x))^2 \cdot dx = 1 \qquad (4)$$

for all values of k, such a set of functions is called orthonormal. A set of orthogonal or orthonormal functions provide the best approximation to any given function $f(x)$ in the least square sense. In such a case the error is given as $$E = \int_a^b \left( f(x) - \sum_{k=1}^{\infty} c_k \cdot \phi_k(x) \right)^2 \cdot dx \qquad (5)$$

the minimum error is found by equating the derivative of E with respect to $c_k$ to zero as follows:

$$\frac{\partial E}{\partial c_k} = 0 \qquad (6)$$

It can be readily shown that the minimum occurs when $$c_k = \frac{\int_a^b f(x) \cdot \phi_k(x) \cdot dx}{\int_a^b (\phi_k(x))^2 \cdot dx} \qquad (7)$$

When using orthonormal functions, the denominator of Equation 7 becomes unity. Also note that Equation 8 shown below is a generalization of Fourier series.

$$f(x) = \sum_{k=1}^{\infty} c_k \cdot \phi_k(x) \qquad (8)$$

A theorem showing that an ONN can map any input vector to any output vector within a mean square error accuracy will now be proven.

The mapping function f that will be discussed maps from a compact subset S of n-dimensional Euclidean space to a bounded subset f(S) of m-dimensional Euclidean space by training on examples $(x_1, y_1), (x_2, y_2), \ldots, (x_j, y_j), \ldots$ of the mapping where $y_j = f(x_j)$. Now the mapping function f has m components, one for each output node. These are designated as $f_1, f_2, \ldots, f_j, \ldots f_m$. Each one of these relate to n other mapping functions as follows:

$$f_j(x_1, x_2, \ldots, x_n) = f_{1j}(x_1) + f_{2j}(x_2) + \ldots + f_{nj}(x_n) \qquad (9)$$

Because of this the index ij is used for the components of the mapping function f between input and output vectors. Also, the index ikj is used for the weights between the sibling and output nodes.

Theorem 1. Given, for any $\epsilon > 0$, a mapping function $$f : x \subset R^n \to y \subset R^m \qquad (10)$$

there exists an ONN that can approximate f to within $\epsilon$ mean squared error accuracy.

Proof: Let us first consider the mapping function $f_{ij}$ that maps the component $x_i$ of the input vector x to the output node j. Let $\epsilon$ be the accuracy to which the mapping function $f_{ij}$ is to be approximated. It has been noted from the error equation, Equation 5, that given any $\delta_{ij} > 0$, there exists a positive integer N and a set of coefficients $c_{ikj}$ such that $$\int_a^b \left( f_{ij}(x_i) - \sum_{k=1}^{N} c_{ikj} \cdot \phi_k(x_i) \right)^2 \cdot dx < \delta_{ij} \qquad (11)$$

The theorem will be proven by first pointing out that the configuration of the ONN shown in FIG. 1 results in an activation at the output node j which is identical to the summation inside the bracket shown on the left hand of Equation 11. This is because the $\phi_k$ terms are generated at the sibling nodes 20. Moreover, the weight of the links 25 between the N sibling nodes and the output node j approaches the values of the coefficients given in Equation 7, as the error at the output node j approaches zero during the training process.

Secondly all n components of the mapping function that maps the input vector x to the output node j are considered. For this the following equation can be formulated:

$$\sum_{i=1}^{n} \int_{a}^{b} \left( f_{ij}(x_i) - \sum_{k=1}^{N} c_{ikj} \cdot \phi_k(x_i) \right)^2 \cdot dx < \delta_j \quad (12)$$

For each input node 10 there is an equation like Equation 11. If the n errors designated as $\delta_{ij}$ at the output node j approach to zero during the training process, their sum $\delta_j$ shown in Equation 12 also approaches zero. This proves our theorem for the output node j. The repetition of this proof for all the output node 30 proves Theorem 1.

When N (number of sibling nodes to be used for each input node 10) is selected to be 3, the following functions were used:

$$\phi_0(x_i) = \frac{1}{\sqrt{2}} \quad (13)$$

$$\phi_1(x_i) = \sin(\pi x_i) \quad (14)$$

$$\phi_2(x_i) = \cos(\pi x_i) \quad (15)$$

When N is selected to be 5, the following two additional functions were used:

$$\phi_3(x_i) = \sin(2\pi x_i) \quad (16)$$

$$\phi_4(x_i) = \cos(2\pi x_i) \quad (17)$$

It can be shown that all five functions given above are orthonormal for $1 <= x <= 1$. In some applications x was lying outside of this range. By placing a sigmoid filter before the input nodes x is forced to remain between 0 and 1. This can be seen by considering the sigmoid shown below.

$$s(x) = \frac{1}{1 + e^{-x}} \quad (18)$$

where $x = -\infty \quad s(x) = 0$ $x = 0 \quad s(x) = 0.5$ $x = \infty \quad s(x) = 1$ In training it is found that when using N=3, the sum of the squared errors initially decreased at a faster rate than when using N=5. However, over a longer period of time N=5 achieved lower errors. In operation the testing time was shortened by combining the $\phi_0$ terms. From Equation 13 it is clear that these terms are not functions of x. This combination reduced the number of sibling nodes from 3n to (2n+1) when N=3, and from 5n to (4n+1) when N=5.

Because the ONN's use either orthogonal functions or orthogonal polynomials a brief background on orthogonal polynomials will now be provided. A detailed description of orthogonal polynomials and the proofs of several theorems cited here are provided in the references entitled "Advanced Engineering Mathematics," Wylie Jr. C. R., (1960), pp. 130-143, McGraw-Hill Book Company, New York, N.Y., and "Numerical Analysis," Milne W. E. (1949), pp. 265-275 and 375-381, Princeton University Press, Princeton, N.J.

Consider a set of (k+1) polynomials of respective degrees m=1,2, ... ,k. If these polynomials have the following property $$\sum_{x=0}^{k} P_{ki}(x) \cdot P_{kj}(x) = 0 \quad (19)$$

for $i \neq j$, they are called orthogonal polynomials.

It can be shown that these (k+1) orthogonal polynomials can be obtained using the following formula:

$$P_{km}(x) = \sum_{i=0}^{m} (-1)^i \binom{m}{i} \binom{m+i}{i} \frac{x^i}{k^i} \quad (20)$$

for m=1,2, ... ,k.

For each m<=k, any polynomial P(x) of degree m can be expressed as a linear combination of orthogonal polynomials as follows:

$$P(x) = \sum_{i=0}^{m} c_i P_{ki}(x) \quad (21)$$

Equation 21 can readily be solved for $c_i$ obtaining the following formula:

$$c_i = \frac{\sum_{x=0}^{k} P(x) P_{ki}(x)}{\sum_{x=0}^{k} (P_{ki}(x))^2} \quad (22)$$

Consider a function f(x) defined for (k+1) equally spaced values x=0,1,2, ... k. Orthogonal polynomials cannot represent f(x) exactly unless f(x) is a polynomial of degree k or less. However, they provide the best polynomial approximation to f(x) in the least-square sense. In this case the error is given as follows:

$$E = \sum_{x=0}^{k} \left( f(x) - \sum_{i=0}^{k} c_i P_{ki}(x) \right)^2 \quad (23)$$

The condition for minimum error is obtained by equating the derivative of E with respect to $c_i$ to zero. The result is as follows:

$$c_i = \frac{\sum_{x=0}^{k} f(x) P_{ki}(x)}{\sum_{x=0}^{k} (P_{ki}(x))^2} \quad (24)$$

Note that the Equation 24 is exactly the same as Equation 22 with P(x) replaced by f(x). This means that the values of $c_i$'s that result in minimum error can now be calculated. This is a very important result and will be used to reduce the training time of the ONN's.

It should also be noted that the orthogonal polynomials described here can be used in ONN's exactly the same way as the orthonormal functions described previously. For example, in a character recognition system, where the components of the input vector are binary and k=1, the following orthogonal polynomials derived from Equation 20 were used:

$$P_{k0}(x) = 1 \quad (25)$$

$$P_{k1}(x) = 1 - 2x \quad (26)$$

By comparing Equations 24 and 7 it can be seen that Equation 24 is a discrete form of Equation 7. In some applications f(x) may not be a continuous function of x. Instead f(x) may consist of several discrete values. If the orthonormal equations given are used with functions having discrete values, Equation 24 rather than Equation 7 will be used. When this is done P(x) in Equation 24 is replaced by $\phi(x)$.

Another important result that will be utilized later should now be pointed out. Note that Equation 22 does not involve m, the degree of polynomial used, and hence N, the number of sibling nodes assigned to each input node, is not involved. If it is desired to increase N, all previously calculated coefficients remain unchanged. Only the coefficients of the new terms need be computed.

DETAILED DESCRIPTION OF THE METHOD

In many applications the input vector has components that have equally spaced values. In some other applications, by using an auxiliary variable, the values of these components could be made to appear as if they were equally spaced. Among these applications the most important group is the one where the components of the input vector are binary.

One such ONN application is the character reading system that was built for the recognition of damaged upper case letters (damaged implies that part of the letter is missing). In this system there were 25 input nodes, i.e., n=25. These nodes were assigned the values of 0 or 1 from a $\times 5$ grid. Also there were 26 output nodes, one for each letter of the alphabet. The output nodes were assigned a target value of 0.5, i.e., a=0.5. Two different versions of this system were built. One of them used orthogonal functions and the other orthogonal polynomials.

The first character reader was built using the orthogonal functions given by Equations 13, 14, and 15, i.e., N=3. In this system it was planned to reduce the training time by initialization of the synaptic links between the sibling and output nodes with the three c coefficients calculated using Equation 24 where $\phi(x)$'s were substituted for P(x)'s. The objective was to start the training process with a small error which can then be reduced to zero within a maximum of fifty cycles. To achieve this objective the three c coefficients were determined and their values substituted for the synaptic links. It was desired to have at a given output node 95% of the activation so that the training process could start with a small error of 5%. Because a=0.5 and the percentage of activation e=0.95, the error was calculated as (a-(e.a)/a=0.05 or 5%.

It should be noted that for purposes of this disclosure, the notation "." stands for multiplication, such that, for example, (4.2)=8.

Before these three coefficients could be calculated, it was necessary to estimate the discrete values of f(x) for the constant, sin, and cos terms given by Equations 13, 14, and 15 respectively. To estimate the values of f(x) the following two assumptions were made:
 (i) Each sibling node contributes an equal amount to the total activation at a given output node;
 (ii) If the sibling nodes of a particular term generates no activation, the nodes of the other terms contribute equal amounts making up the difference.

These assumptions were based on the observation of several repetitive patterns on the synaptic link values that were generated during training sessions.

The activation generated by each node was assumed to be f(x)=(e.a)/(N.n). Since a=0.5, e=0.95, N=3, and n=25, f(x) was 0.0063. However, because for x=0 and x=1 the sin and cos terms resulted in zeros in Equation 24, i.e., no activation, f(x) for the constant term was assumed to be $3\times 0.0063$ or 0.189 to make up the difference. Based on this the three coefficients were calculated as follows:

$c_1 = 0.0267$ $c_2 = 0.0$ $c_3 = 0.0$

In the program the synaptic links between the sibling and output nodes were represented by the array m(k)(i)(j) where k, i, and j were indices for the sibling, input nd output nodes respectively. Hence there were a total of $3\times 25\times 26 = 1950$ coefficients. The m(k)(i)(j) array was initialized with the three coefficients given above in accordance with their k index, which varied from 1 to 3.

The use of this technique resulted in a dramatic 200 fold reduction in the number of training cycles necessary for a satisfactory operation. More specifically, using this technique, the sum of the squared errors over 26 output nodes was reduced to 0.000000 after 7 cycles of training.

Note that after the first cycle the sum of the squared errors was 0.015569. This was slightly lower than the calculated value of $26\times (0.5-0.475)^2 = 0.0163$. In training, a modified form of the delta rule was used. More specifically, in training the data associated with letter A was used with the output node #1, and the data associated with letter B was used with the output node #2, etc.. Also all output nodes were assigned the same target value of 0.5. The output node having the smallest error identified the character, damaged or not. The learning rate was 0.01. The coefficient of the momentum term was 0.4.

A second character reader was built with the orthogonal polynomials given by Equations 25 and 26. Once again it was assumed that the activation generated by each sibling node was f(x)=((e.a)/(N.n)). Since a=0.5, e=0.95, N=2, and n=25, f(x) was 0.0095. Because for x=0 and x=1 the term [1−2x] resulted in zero in Equation 24, i.e. no activation, f(x) for the constant term was assumed to be $2\times 0.0095$ or 0.019 to make up the difference. Based on this the two coefficients were calculated as follows:

$c_0 = 0.0190$ $c_1 = 0.0$

The sum of the squared errors over 26 output nodes using the coefficient initialization technique was 0.000000 after 7 training cycles. After the first cycle the sum of the squared errors was 0.016250, slightly lower than the calculated value of 0.0163. The learning rate was 0.01. The coefficient of the momentum term was 0.4.

The coefficient initialization technique introduced above was for applications where the components of the input vector had equally spaced values. This condition cannot be met in many applications where the components of the input vector have greatly varying values. An ONN curve detection system that was built, for example, is one of those applications. Because of this a general method for reducing the training time will now be presented. This method can be used in all applications without placing any restrictions on the values of the components of the input vector.

In this curve detection system the components of the input vector had widely varying negative and positive values. These values were transformed into {0,1} space by placing a filter before the input nodes of the ONN. This filter used the sigmoid function given by Equation 18. This brought the values of the components of the input vector much closer to each other. However, they were still not equally spaced and Equation 24 could not be used.

It was noticed that when Equation 24 was used previously, only the coefficient of the constant term had a non-zero value. Also the activation of the constant term was increased to make up the loss of activation from the nodes of the other terms. In addition, it was observed that at the end of training the values of the synaptic links corresponding to the constant term were only a few percent higher than the calculated values. Based on this the following general method was introduced:

(i) Place a sigmoid filter before the input nodes 10 of the ONN. Note that this filter is only used if the values of the components of the input vector are not equally spaced;

(ii) Calculate the coefficient of the constant term using Equation 24 and assuming an activation of $f(x)=((e.a)/)$ as follows:

a) when using orthogonal functions $$c_1 = \frac{e \cdot a \cdot \sqrt{2}}{n} \quad (27)$$

b) when using orthogonal polynomials $$c_0 = \frac{e \cdot a}{n} \quad (28)$$

where
- $a$ = the actual target value assigned to the output nodes
- $e$ = percentage of the target value achieved before training
- $n$ = number input nodes Recall that previously these constants were $a=0.5$, $e=0.95$ and $n=25$. Also note that Equations 27 and 28 do not involve N, the number of sibling nodes assigned to each input node.

(iii) Set the coefficients of the other nodes to zero.

The use of this technique in the curve detection system reduced the sum of the squared errors over four output nodes to 0.000000 in fewer than ten cycles. The minimum number of cycles encountered were 6 when using orthogonal functions with N=5 and maximum was 8 when using orthogonal polynomials with N=4.

In the curve detection system there were ten input nodes, i.e. $n=10$, and all four output nodes were assigned the same target value of 0.5, i.e., $a=0.5$. As before it was aimed to achieve 95% of the activation before the training started, i.e, $e=0.95$, $(e.a)=0.475$.

Note that in some of the experiments "e" was varied in steps of 0.1 from 0.9 to 0.97. This variation did not change the number of cycles that was required to reduce the error to zero (0.000000). However, in comparison to $e=0.95$, $e=0.9$ resulted in a slower rate of decrease of the error and $e=0.97$ in a faster rate of decrease.

The first curve detection system that was built used the orthogonal functions given by Equations 13,14,15,16, and 17, i.e. N=5. For this f(x) was calculated as 0.0475 and $c_1$ as 0.0672. The other four coefficients were set to zero. The sum of the squared errors over 4 output nodes using these coefficients was 0.000000 after 8 training cycles. After the first cycle the error was 0.002500. This was the same as the calculated value of $4\times(0.5-0.475)^2=0.0025$. The learning rate was 0.03. The coefficient of the momentum term was 0.4.

The second curve detection system was built using the following orthogonal polynomials derived from Equation 20:

$$P_{k0}(x)=1 \quad (29)$$

$$P_{k1}(x)=1-(2/9)x \quad (30)$$

$$P_{k2}(x)=1-(6/9)x+(6/72)x(x-1) \quad (31)$$

$$P_{k3}(x)=1-(12/9)x+(30/72)x(x-1)-(20/504)x(x-1)(x-2) \quad (32)$$

Note that since there were 10 input nodes, $k=9$. For this system f(x) was calculated as 0.0475 and $c_0$ as 0.0475. The other three coefficients were set to zero. The sum of the squared errors over 4 output nodes using these coefficients was 0.000000 after 6 training cycles. After the first cycle the sum of the squared errors was once again 0.002500. The learning rate was 0.01. The coefficient of the momentum term was 0.4.

A third curve detection system was built using orthogonal polynomials given by Equations 29, 30, 31, and 32. This system was similar to the one described above except that each input vector was mapped to a different output vector. More specifically, the following four output vectors were used:

((0.5, 0.1, 0.1, 0.1))

((0.1, 0.5, 0.1, 0.1))

((0.1, 0.1, 0.5, 0.1))

((0.1, 0.1, 0.1, 0.5))

Because there were now four target values, and four times as many synaptic links as before, it was necessary to calculate four different coefficients of the constant term. Fortunately, there are only two distinct coefficients. One of these is for the nodes having the target value of 0.5 and the other for the nodes having the target value of 0.1. These coefficients are calculated using an extension of the general method described previously. This extension will now be described by first giving an example.

When the output nodes are decoupled from each other and all of them have the same target value, calculation of the coefficient of the constant term is carried out quite easily using Equations 27 or 28. However, when there are four output nodes with different target values, the distribution of activations has to be considered and the coefficients of the constant term has to be calculated on the basis of this distribution.

Recall that previously the training was started with a 5% error, i.e., $a=0.5$, $e=0.95$, and $(e.a)=0.475$. This resulted in a sum of the squared errors of $4 \times (5-0.475)^2 = 0.0025$. In this case there was a total activation, $F_1(x)$, on the output node with the target value of 0.5 and three total activations, three $F_2(x)$'s, on the nodes with the target value of 0.1. The activations that result in the same sum of the squared errors over the four output nodes is now calculated as follows:

$$(0.5 - F_1(x))^2 + 3.(0.1 - F_2(x))^2 = 0.0025 \quad (33)$$

Because the ratio of the two target values is 5 to 1, it is assumed that $F_1(x) = 5 \times F_2(x)$. Based on this assumption the quadratic given by Equation 33 is solved finding $F_1(x) = 0.4528$ and $F_2(x) = 0.0906$. Since there are ten input nodes, the coefficient of the constant term for the output node with the target value of 0.5 is 0.04528 and the other three coefficients for the output nodes with the target values of 0.1 are 0.00906.

When the system was initialized with these coefficients, the sum of the squared errors over 4 output nodes became 0.000000 for each output vector after 6 cycles. After the first cycle the sum of the squared errors was 0.0025. The learning rate was 0.01. The coefficient of the momentum term was 0.4.

Having given an actual example, the extension of the general method to cases where every input vector is mapped to a different output vector. It is assumed that there is one larger target value $a_1$ and $(m-1)$ smaller target values $a_2$'s, where m is the number of output nodes. The coefficient of the constant term for the node with the target value $a_1$, $c_1$ and the other $(m-1)$ nodes with the target values of $a_2$, $c_2$, are calculated as follows:

$$c_1 = \left(\frac{a_1}{a_2}\right) \cdot \left(\frac{k}{n}\right) \cdot \left(\frac{-B \pm \sqrt{B^2 - 4 \cdot A \cdot C}}{2 \cdot A}\right) \quad (34)$$

$$c_2 = \left(\frac{k}{n}\right) \cdot \left(\frac{-B \pm \sqrt{B^2 - 4 \cdot A \cdot C}}{2 \cdot A}\right) \quad (35)$$

where $$A = a_1^2 + (m-1).a_2^2 \quad (36)$$

$$B = 2.a_1^2.a_2 + 2.(m-1).a_2^3 \quad (37)$$

$$C = a_1^2.a_2^2 + (m-1).a_2^4 - m.a_1^2.a_2^2.(1-e)^2 \quad (38)$$

$k = 2^{0.5}$ if orthogonal functions used
$k = 1$ if orthogonal polynomials are used
$n =$ number of input nodes
$e =$ percentage of activation to be achieved before training Note that e is always set to 0.95, and in the curve detection system example $a_1 = 0.5$, $a_2 = 0.1$, $m = 4$, $n = 10$, and $k = 1$. Also note that in the above example the negative values of the square root in Equations 34 and 35 were used. When the positive values were used, it was found that $c_1 = 0.0547$ and $c_2 = 0.010946$. When the system was initialized with these values, the results were identical to the ones obtained with the coefficients $c_1 = 0.04528$ and $c_2 = 0.00906$.

So far five different training examples have been presented. In these examples the sum of the squared errors became 0.000000 in fewer than ten cycles. The minimum number of cycles encountered was 6 and maximum number was 8. It is found that (i) Orthogonal functions and orthogonal polynomials perform equally well; and
(ii) Although orthogonal functions allow the use of higher learning rates, orthogonal polynomials result in slightly smaller errors for the same number of cycles.

Now a more detailed look will be taken at the behavior of the sum of the squared errors in the curve detector system built with orthogonal polynomials. In particular, these errors will be compared with the errors encountered in a similar curve detection system built using backpropagation technique and trained with the same sample curves. In Table 1 the number of cycles are listed against the sum of the squared errors encountered in the ONN and backpropagation networks using a scale of $10^{-6}$.

TABLE 1

Number of Cycles vs. Sum of Squared Errors

| # Cycles | Errors in ONN | Errors in Backpro. |
|---|---|---|
| 5 | 1.743 | 156,655 |
| 6 | 0.085 | 155,693 |
| 7 | 0.033 | 154,713 |
| 8 | 0.023 | 153,709 |
| 9 | 0.019 | 152,679 |
| 10 | 0.018 | 151,609 |
| 50 | 0.016 | 77,667 |
| 100 | 0.015 | 31,397 |
| 500 | 0.008 | 1,238 |
| 1000 | 0.005 | 148 |

As can be seen from the Table 1, the sum of the squared errors encountered in the ONN reduces slowly after the 10th cycle. At the end of the 10th cycle the sum of the squared errors of the ONN is smaller than that of the backpropagation system by a factor of $8.422 \times 10^6$. At the end of the 1000th cycle this factor is reduced to $29.6 \times 10^3$.

It was mentioned previously that conventional single-layer networks cannot learn mappings that have very different outputs from very similar inputs. To illustrate that this does not apply to ONN's, an example will be given showing how the classic exclusive-or problem can be solved in an ONN using, for example, the polynomials given by Equations 25 and 26.

Consider an ONN with two input and two output nodes where the target values of 0.5 are assigned to the output nodes and the coefficients of the constant terms are set to 0.25. In this system minimum error at the output node #1 signals a zero and at the output node #2 a one. At the end of the learning process the weights between the input nodes and the output node #1 will be (1,1), and the weights between the input nodes and the output node #2 will be (1,1).

DETAILED DESCRIPTION OF THE APPARATUS

The architecture illustrated in FIG. 1 consists of three sets of nodes, input 10, sibling 20, and output nodes 30. The input nodes 10 and output nodes 30 are neuron-like units. The sibling nodes 20 are neural subsystems made up of many neurons. These nodes house special functions that carry out the orthogonal expansion of the mapping function between input and output vectors I and O, respectively. There are n input nodes 10. FIG. 1 shows the first, second and the n'th input node. Each input node 10 branches out into N sibling nodes 20 through first synaptic link means 12, 12', etc. the conductivity, or weight, of which remains fixed at unity during the training process. Note that in FIG. 1, N=3. As a result of this branching out there are (n.N) sibling nodes. Also there are m output nodes. FIG. 1 shows the first, second and m'th output node. Each output node 30 is connected to every sibling node through second synaptic link means 25, the conductivity, or weight, of which changes during the training process to reduce the difference between the actual and desired outputs at these output nodes 30.

FIG. 2 is a block diagram illustrating the training portion of the artificial neural network architecture to be implemented either on a hardware unit or on a computer chip.

Because all sets of N sibling nodes 20 house the same set of N transfer functions, a unit consisting of either N special arithmetic units or one general arithmetic unit 14 can be connected to n input nodes through an input multiplexer 16. The N outputs of this arithmetic and storage unit 14 are connected to N weight multipliers 18. The outputs of N weight multipliers 18 are then connected to the adder unit 22 where the activations are generated by adding the products of the signals from sibling nodes 20 and the corresponding weights of the synaptic links 25 shown in FIG. 1 between sibling and output nodes 20 and 30, respectively. The output of the adder is connected to m output nodes through an output multiplexer 24. The output nodes 30 are connected to a comparitor unit 26 where the activations are compared with the target values and an error signal is generated. This error signal is fed into a weight changer unit 28 that determines how much a particular weight is to be changed to minimize the error. In addition a weight initializer unit 32 is connected to the weight multipliers 18 for the purposes of setting the initial values of the weights so as to reduce the duration of the training time.

It is clear from the above description of the hardware of the ONN shown in FIG. 2 that the one subsystem comprising an arithmetic and storage unit, an adder and a set of N weight multipliers, a weight changer and a weight initializer can be multiplexed on one side to n input nodes and on the other side to m output nodes making the design of a hardware unit or computer chip quite compact and economical.

For neural networks that use the same target value in all output nodes the training time can be considerably reduced by duplicating the certain portion of the hardware system described in the paragraph above by m times. The portion of the hardware to be duplicated consists of a weight initializer, a weight changer, an adder, a set of N weight multipliers, and a comparitor unit. In such an arrangement the arithmetic unit processes all the input data associated with the output node #1, stores it in memory, and starts the training process for the output node #1. At the same time the arithmetic unit starts processing and storing the input data associated with the output node #2. When this is done the training process for the output node #2 starts without waiting for the conclusion of the training process for the output node #2. Because arithmetic process takes much shorter time to complete than training process, the training of "m" output nodes is carried out almost in parallel. The duplication of the units mentioned above is quite easy to accomplish on a computer chip. Also note that the arithmetic unit is still connected to n input nodes through an input multiplexer. However, because there are as many adders, comparitors, etc., as the output nodes, no output multiplexer is necessary.

Figure 3:
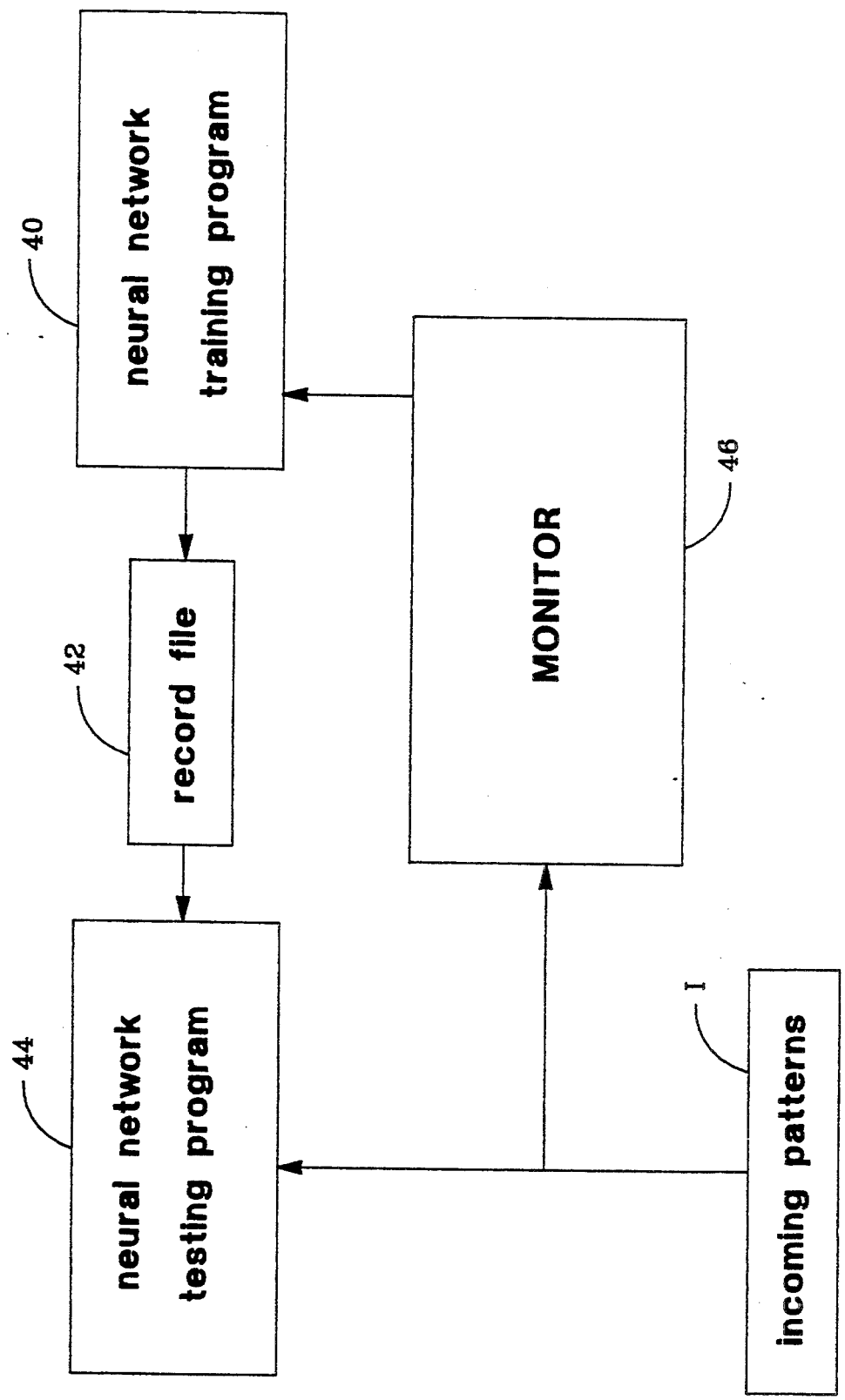
FIG. 3 is a diagram of the software architecture of the present invention utilizing a monitor to make the invention part of a real-time control system and allow the invention to learn during operation and improve its performance.

The ability of the present invention to learn in real-time makes it possible for a neural network to be part of a real-time control system. The block diagram of the software architecture of the present invention to achieve this objective is shown in FIG. 3. The neural network "training program" 40 using sets of sample patterns I represented by input data signals $I_1$-$I_n$ generates the "record_file" 42 that lists synaptic link values 25. The neural network "testing program" 44 receives the incoming patterns I, or input data signals $I_1$-$I_n$ and identifies them using the record_file. An output device 48 provides the identification/classification/prediction of the testing program 44. The incoming data signals are also received by the "monitor" 46. An actual outcome signal is introduced to the monitor 46 by actual outcome source 50, which may be a user activated device or an automatic source of relevant actual data signals corresponding with the actual result which the neural network is designed to preduct or ascertain. This outcome signal, which may be provided by any appropriate teacher, is then compared to the value of the output device through comparison means of the monitor. Some of the system control functions of the monitor are as follows:

(i) to compare the predictions. yielded by the test program 44 with the actual outcome or the input by a teacher;
(ii) to add one or more new identification classes;
(iii) to add a new pattern or a set of patterns to the training patterns of an existing class;
(iv) to remove a pattern or a set of patterns from the training patterns of an existing class;
(v) to allow the neural network to learn on the job and improve its performance.

The monitor performs these functions by capturing a pattern or a set of patterns and causing the training program to learn them with the existing patterns or relearn the existing patterns after the removal of these patterns. When this is done, the training program modifies the record_file. The monitor 46 can take many forms. For example, it can be an expert system, a second neural network or a software feature built into the original neural network. In its most elementary form the monitor could simply be an operator acting as a teacher.

Considering a diagnostic application of the curve detection system built with an ONN and described earlier, if an unknown family of patterns appears several times causing a certain identifiable result or outcome, the monitor 46 observes and tracks this phenomenon. Because this particular family was not included in training, the neural network testing program 44 is unable to identify it. If there are more than "m" duplications of the hardware system illustrated in FIG. 2, the monitor captures the data associated with this new family of patterns and immediately trains a new (m+1)th output node without changing the weights associated with "m" previous output nodes allowing the system thereafter to identify these pattern.

In many industrial applications metal or plastic parts are engraved with letters for the purpose of identification. On the assembly line these characters are read by an optical scanner and the information is transmitted to the next station. Unfortunately during the manufacturing operation quite often a few of these characters get damaged or covered with dirt. Because of this there is a need for reading damaged characters. Also, because of the high speed of the modern assembly line, the identification of a string of about 20-30 alphanumeric characters has to be done in less than a second.

Considering the damaged character reading system built with an ONN and described earlier, training of the neural network requires a large number of actual examples of damaged characters. After training with a few samples, if an operator could act as a monitor, he or she could identify the damaged characters that the neural network could not. This causes the system to be retrained quickly and efficiently.

Considering the case where the monitor is simply a software feature within the neural network, if a damaged character cannot be identified within a preset error limit, the monitor examines the errors that occurred on all the output nodes. The character corresponding to the output node with the smallest error is then identified as being the most similar one to the damaged character. Based on this finding the training program learns this pattern and modifies the record_file. As a result, the neural network can learn on the job while the control system functions within its time constraints.

Unfortunately, there are instances where the software feature described above may come out with two or more equally similar characters and the neural network cannot identify the damaged character. To handle these cases it is necessary to include a rule-based expert system in the monitor. Such an expert system will work on the statistical likelihood of one character being followed by another within the alphanumeric character string engraved on the parts. For example, one of the rules may state that if the first character is a "t" and the second is "h" then the third character is an "e". The use of such an expert system as a part of the monitor will break the deadlock resulting from having equally similar characters and allow the modification of the record_file in the usual manner.

Also two different types of neural networks can function side by side and learn from each other on the Job. The operation of the damaged character reader described earlier was based on building a 5×5 grid on and around a character and obtaining binary inputs on the intersections of this grid and the character. Another character reading system based on "feature detection" can be built and included in the monitor. A character reader based on feature detection concentrates on the features of a letter instead of its coordinates. For example, it will always recognize an oval shaped closed curve as the letter "O" regardless of its intersection with its grid. When using a monitor equipped with a neural network, if the first neural network does not recognize a damaged character and the second one does, then the monitor modifies the record_file of the first neural network. On the other hand, if the situation is reversed so that the second one does not recognize the damaged character and the first one does, the monitor then modifies the record_file of the second neural network.

Consider the case where a neural network classifies a set of conditions and recommends certain actions to the control system based on these classifications. In such case, if the monitor using other means, for example, an expert system, determines that a pattern classified as a particular class by the neural network could result in an undesirable action, the monitor removes such a pattern from the original sample of patterns, retrains the system and modifies the record_file. This real-time process of learning and retraining is an important advantage in time critical control system application where, for example, a missile or torpedo is fired to hit a particular target.

One of the best examples of on the job training can be given by citing the operation of a neural network designed to predict the up and down movements of the stocks. When the market opens up in the morning, the neural network may predict the fluctuations of the stocks with a 30-35% accuracy. However, if it is allowed to operate and train itself, by mid-day its accuracy may increase to 80-85%. This can be achieved by the monitor adding to the training patterns several new patterns corresponding to the movements that the neural network could not predict, and by removing from the training patterns some patterns that resulted in the wrong predictions.

By way of illustration of the above example regarding the stock market, a number of input data signals 1 through N corresponding to n market parameters (such as unemployment rate, inflation rate, prime rate, etc.) are input to input nodes 1 through n, respectively. These input data signals $I_1$ through $I_n$ correspond to n market parameters and represent the "condition" of the market at that particular time. These parameters are then mapped to the output nodes $O_1$ through $O_m$, which in turn is converted to an output signal which is displayed on an output device 48 connected to testing processor 44 indicating a particular action to be taken. For example, the neural network may recognize that, in the past, with a given set of input parameters $I_1$ through $I_n$, the market behaved in a particular, known, way when that same market "condition" is present again, the neural network will output a recommendation predicated on what occurred in the market when that set of parameters was earlier present. The actual market response is thereafter fed into the neural network. If the actual response differs from the output recommendation, or prediction, which the neural network made, the training process or 40 after retraining itself will adjust the weights of synaptic links 25, thereby and removing the response to such a pattern from the original sample of patterns, retrain the system and modify the record_file.

The monitor in some ways functions like the operating system of a computer or frontal lobe of a human brain. It controls and coordinates the operation of the testing and training programs of the neural network and its associated files.

Therefore, the training portion of the artificial neural network architecture can be carried out wherein arithmetic unit 14 processes all of the input data $I_1-I_n$ associated with the output node #1, stores the associated weight values in memory, and starts the training process for output node #1. At the same time the arithmetic unit starts processing and storing the input data associated with output node #2. When this is done the training process for output node #2 starts without waiting for the conclusion of the training process for output node #1. Because the arithmetic process takes much shorter time to complete than training process, said training of "m" output nodes is carried out almost in parallel resulting in a reduced training time. Further, there can be more than "m" duplications of subsystems consisting of "N" weight multipliers, an adder, a comparitor, a weight changer, and a weight initializer so that if an unknown family of patterns appears several times causing a certain identifiable result or outcome, and if the data associated with said new family of patterns is captured, then a new (m+1)th output node can be immediately trained without changing said weights associated with "m" previous output nodes allowing the system thereafter to identify said patterns.

The ONN is very important in many military applications, because its real-time training and testing function can be implemented using a special computer chip. This importance becomes greater in applications involving, for example, torpedoes, missiles, super-sonic aircraft, etc. where space is at a premium.

For example, in an aircraft, missile or a torpedo, an ONN may be used to map a set of parameters pertaining to the feature and terrain maps, weather, aircraft or missile type, primary and secondary targets, time on target, etc. to a specific mission and route plan. It would be very desirable to train the ONN during flight with the latest information about weather, intelligence, etc., so that accurate mission and route plans could be produced.

Similarly an ONN may be used to map a set of mission and route plans to a specific data pertaining to the speed, rate of climb, rate of turn, etc. Also based on this data an ONN may be used to predict the position of the aircraft/missile/torpedo at a certain instant of time. If this prediction is found to be wrong, the monitor using reverse mapping would attempt to determine the data that caused this inaccuracy.

The reverse mapping is achieved using the same ONN shown in FIGS. 1-3, but training it with coordinates at a certain instant of time as input data signals, and the speed, rate of climb, rate of turn, etc. as output data signals. To achieve this it is required to have two record_files. One of these would contain synaptic information for mapping in the forward direction and the other would contain synaptic information for mapping in the reverse direction. It is also necessary to have two parameter files, one for the forward direction and the other for reverse. These files list the number of input and output terminals used, as well as other important parameters.

If the monitor 46 fails to find any data from teacher 50, such as the speed, rate of climb, etc., that could have caused this inaccuracy, it would assume that the mapping functions used by the ONN changed due to some other unknown external or internal factor. For example, in the case of a torpedo this unknown factor could be an unexpected under-water current. To compensate for this effect the monitor would retrain the ONN. This retraining could take place several times on route and, as a result, the probability of hitting the target becomes much greater.

Figure 4:
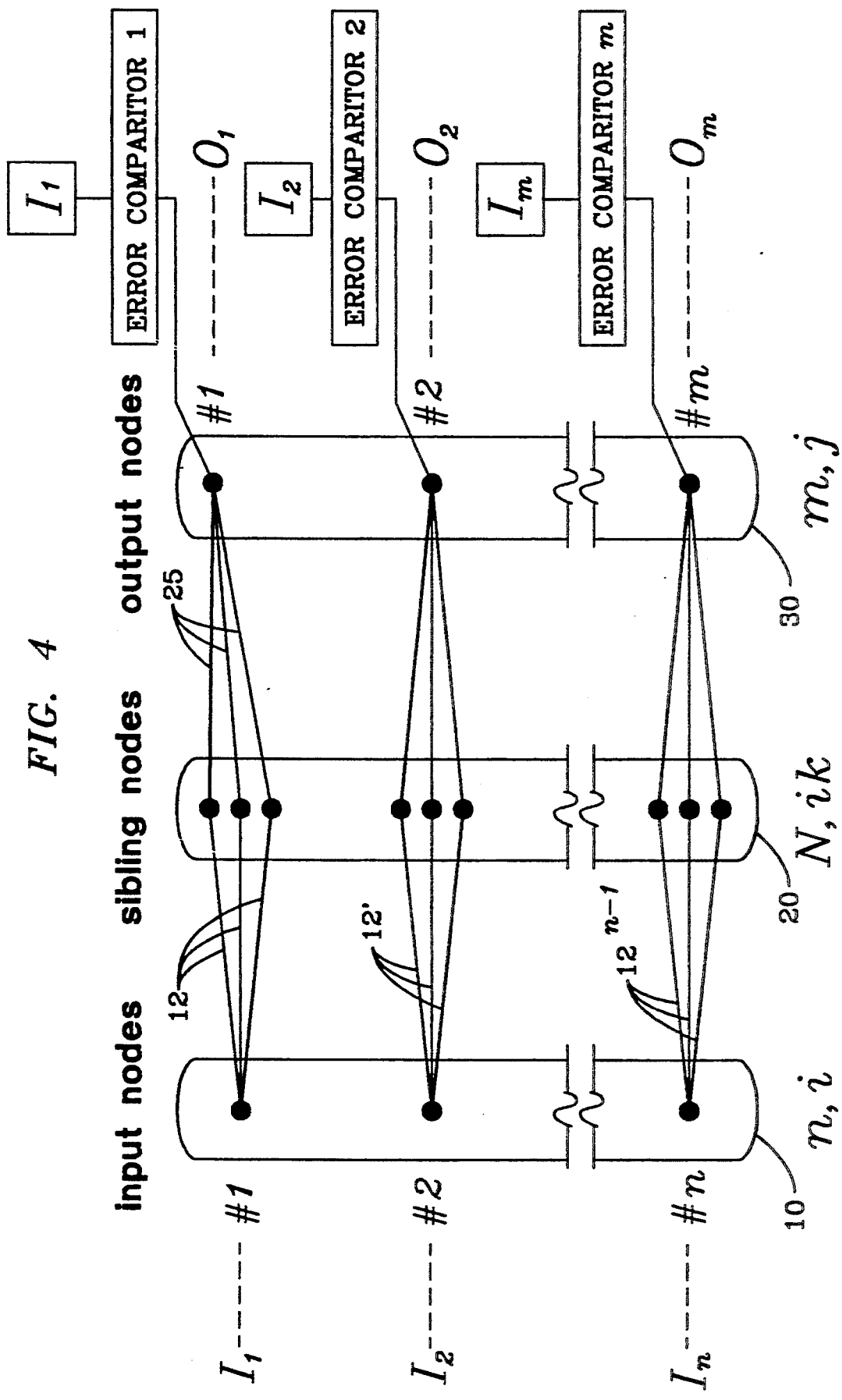
FIG. 4 is a diagrammatic illustration of an auto-associative neural network used with an embodiment of the present invention.

Another learning paradigm is known as "auto-association" in which an input pattern is associated with itself. The goal here is pattern completion. When an incomplete pattern is presented, the auto-associator restores it to its original form. The architecture of the auto-associative neural network is shown in FIG. 4. This network is the same as that of FIG. 1 excepting that the number of output nodes is equal to the number of input nodes, i.e., n=m. That is, output node #1 is connected to input node #1, output node #2 is connected to the node #2, output node #3 is connected to input node #3, etc.

The target value at each output node is equal to the input data signal at the corresponding input node, i.e., $a_j = x_i$ where i=j. It should be noted, however, that in applications where the components of the input vector are not equally spaced the input signal may be put through a sigmoid filter given by Equation 18. Also it should be noted that because the target value at each output node is different, the coefficient of the constant term for each set of sibling nodes will be different.

Based on the foregoing, the general method of coefficient initialization can be stated for auto-associative neural networks as follows:

(i) Place a sigmoid filter before the input nodes of the ONN. Note that this filter is only used if the values of the components of the input vector are not equally spaced;

(ii) Calculate the coefficient of the constant term using Equation 24, assuming an activation of $f(x) = (e \cdot x_i)/n$ as follows:

a) when using orthogonal functions $$c_{i1} = (e \cdot x_i 2^{0.5})/n \quad (39)$$

b) when using orthogonal polynomials $$c_{i0} = e \cdot x_i /n \quad (40)$$

where
$x_i$ = the actual target value assigned to the output node j where i=j
e = percentage of the target value achieved before training n=number input nodes=m=number of output nodes.

(iii) Reset weights of second synaptic like means to the same value when using orthogonal functions prior to each cycle.

Recall that previously these constants were a=0.5, e=0.95 and n=25. Also note that Equations 27 and 28 do not involve N, the number of sibling nodes assigned to each input node; and (iv) Set the coefficients of the other nodes to zero.

An auto-associative neural network together with a pattern associative neural network was used to identify damaged characters. The operation of the two neural network system was based on the identification of features. The use of features rather than the coordinates of the points of a letter to identify characters is very efficient, and it makes the positioning of an optical device to capture the image of a character very easy. The problem, however, with using features is that if the character is damaged, i.e., any of its points is missing, then the feature is lost. For example the letter "O" can be identified because it is an oval shaped closed curve. However, if one of the points is missing, the curve is no longer closed, and the closed loop feature is lost.

In this embodiment, an auto-associative neural network was trained with the features of the undamaged characters. After training, when a damaged character is submitted to the auto-associative network, the auto-associative network attempted to restore most of the missing features. When this was done the pattern associative network shown in FIGS. 1 and 2 identified the character. In the auto-associative network a learning rate of 0.001 was used, and the coefficient of the momentum term was 0.4.

The advantage of learning in real-time is that if a new character, such as a # sign, appears and is recognized as a new sign, the auto-associative neural network can immediately train itself with the undamaged # sign so that it can restore its damaged versions. This basic identification concept can be extended from characters to symbols which can be signatures, radio signals, mechanical vibrations, battle field conditions, pictures, etc.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. An artificial neural network architecture comprising:
   a plurality of input terminals adapted to receive n input data signals corresponding to an input pattern to be learned by said network;
   each said input terminal being connected to a set of N arithmetic and storage units, said arithmetic and storage units being capable of producing the first N terms of either an orthogonal polynomial expansion function or an orthogonal expansion function, where the arguments of said terms are from said input data signal and not from the cumulative probability distribution function of said input data signal;
   a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;
   means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;
   a comparitor and error generator adapted to receive m said activation values from m said output nodes and compare said activation values from predetermined target values initially ascribed to said output nodes to generate m error signals;
   said weight changer adapted to receive m said error signals from said comparitor and error generator to determine how much a particular signal from said weight changer is to be changed to minimize said error signals, said weight changer thereafter sending an output signal to said weight multiplier during a learning process of the network.

2. The artificial neural network architecture of claim 1, further comprising an input multiplexer separate from said artificial neural network architecture connected between said N arithmetic and storage units and said input terminals.

3. The artificial neural network architecture of claim 2, further comprising an output multiplexer connected between said output nodes and said means for adding.

4. The artificial neural network architecture of claim 3, wherein said artificial neural network architecture is embodied on a computer chip.

5. The artificial neural network architecture of claim 3, wherein said artificial neural network architecture is embodied on a hardware unit.

6. The artificial neural network architecture of claim 3, wherein the learning process is carried out by simulation of hardware implementation of the artificial neural network on a computer.

7. The artificial neural network architecture of claim 3, wherein said sets of arithmetic and storage units generate either an orthogonal polynomial expansion function or an orthogonal expansion function as a function of said input data signals by placing at each of said arithmetic and storage units a term of said expansion function and output signals of said multipliers set to correspond to products of output signals from each of said N arithmetic and storage units and the corresponding N coefficients of said expansion function.

8. The artificial neural network architecture of claim 7, wherein said arithmetic and storage units express said input data signals in an expanded form and thereby create a single-layer neural network having (n) (N) virtual input nodes and m said output nodes that do not use nonlinear functions and, thereby, free said neural network from the problems of local minima.

9. An artificial neural network architecture comprising:
   a plurality of input terminals adapted to receive n input data signals corresponding to an input pattern to be learned by said network;
   each said input terminal being connected to a set of N arithmetic and storage units, said arithmetic and storage units being capable of producing the first N terms of either an orthogonal polynomial expansion function or an orthogonal expansion function as a function of said input data signals;
   a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;
   means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;
   a comparitor and error generator adapted to receive m said activation values from m said output nodes and compare said activation values from predetermined target values initially ascribed to said output nodes to generate m error signals;
   said weight changer adapted to receive m said error signals from said comparitor and error generator to determine how much a particular signal from said weight changer is to be changed to minimize said error signals, said weight changer thereafter sending an output signal to said weight multiplier during a learning process of the network;
   an input multiplexer separate from said artificial neural network architecture connected between said N arithmetic and storage units and said input terminals;
   an output multiplexer connected between said output nodes and said means for adding;
   wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, each output signal of each of the N said arithmetic and storage units applied to a first unit of each set of N said weight multipliers is independent of said input data signals and equals unity when an orthogonal polynomial expansion function is used.

10. The artificial neural network architecture of claim 9, wherein said expansion function stored in (n) (N), said arithmetic and storage units is in accordance with the following equation when an orthogonal polynomial expansion function is used:

$$P_{km}(x) = \sum_{i=0}^{m} (-1)^i \binom{m}{i}\binom{m+i}{i}\frac{x^i}{k^i} \qquad (20)$$

where $P_{km}(x)$=orthogonal polynomial of degree $m = 1, 2, \ldots, k$.

11. An artificial neural network architecture comprising:
a plurality of input terminals adapted to receive n input data signals corresponding to an input pattern to be learned by said network;
each said input terminal being connected to a set of N arithmetic and storage units, said arithmetic and storage units being capable of producing the first N terms of either an orthogonal polynomial expansion function or an orthogonal expansion function as a function of said input data signals;
a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;
means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;
a comparitor and error generator adapted to receive m said activation values from m said output nodes and compare said activation values from predetermined target values initially ascribed to said output nodes to generate m error signals;
said weight changer adapted to receive m said error signals from said comparitor and error generator to determine how much a particular signal from said weight changer is to be changed to minimize said error signals, said weight changer thereafter sending an output signal to said weight multiplier during a learning process of the network;
an input multiplexer separate from said artificial neural network architecture connected between said N arithmetic and storage units and said input terminals;
an output multiplexer connected between said output nodes and said means for adding;
wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, said output signal of said weight changer is independent of said input data signals and equals ($\frac{1}{2}^{0.5}$) when an orthogonal expansion function is used.

12. The artificial neural network architecture of claim 11, wherein the term of the expansion function stored in each of said (n) (N) arithmetic and storage unit is in accordance with a generalized Fourier series as formulated in the following equation when an orthogonal expansion function is used:

$$f(x) = \sum_{k=1}^{\infty} c_k \cdot \phi_k(x) \qquad (8)$$

where
$f(x)$=generalized Fourier series;
$Q_k(x)$=orthogonal function;
$C_k = k^{th}$ coefficient.

13. An artificial neural network architecture comprising:
a plurality of input terminals adapted to receive n input data signals corresponding to an input pattern to be learned by said network;
each said input terminal being connected to a set of N arithmetic and storage units, said arithmetic and storage units being capable of producing the first N terms of either an orthogonal polynomial expansion function or an orthogonal expansion function as a function of said input data signals;
a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;
means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;
a comparitor and error generator adapted to receive m said activation values from m said output nodes and compare said activation values from predetermined target values initially ascribed to said output nodes to generate m error signals;
said weight changer adapted to receive m said error signals from said comparitor and error generator to determine how much a particular signal from said weight changer is to be changed to minimize said error signals, said weight changer thereafter sending an output signal to said weight multiplier during a learning process of the network;
an input multiplexer separate from said artificial neural network architecture connected between said N arithmetic and storage units and said input terminals;
an output multiplexer connected between said output nodes and said means for adding;
wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, target values associated with all of said output nodes are identical and consequent learning time of said network is reduced by assigning an initial value to a first unit of each set of N weight multipliers in accordance with the following equation and setting values of all remaining (N−1) weight multipliers to zero when using orthogonal functions:

$$c_1 = \frac{ea\sqrt{2}}{n} \qquad (27)$$

where
$C_1$ = value of first weight multiplier;
a = actual target value of output nodes;
e = percentage of target value achieved;
n = number of input nodes.

14. An artificial neural network architecture comprising:

a plurality of input terminals adapted to receive n input data signals corresponding to an input pattern to be learned by said network;

each said input terminal being connected to a set of N arithmetic and storage units, said arithmetic and storage units being capable of producing of the first N terms of either an orthogonal polynomial expansion function or an orthogonal expansion function as a function of said input data signals;

a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;

means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;

a comparitor and error generator adapted to receive m said activation values from m said output nodes and compare said activation values from predetermined target values initially ascribed to said output nodes to generate m error signals;

said weight changer adapted to receive m said error signals from said comparitor and error generator to determine how much a particular signal from said weight changer is to be changed to minimize said error signal, said weight changer thereafter sending an output signal to said weight multiplier during a learning process of the network;

an input multiplexer separate from said artificial neural network architecture connected between said N arithmetic and storage units and said input terminals;

an output multiplexer connected between said output nodes and said means for adding;

wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, said predetermined output node target values are identical and consequent learning time of said network is reduced by assigning an initial value to a first unit of each set of N said weight multipliers in accordance with the following equation and setting values of all remaining (N−1) weight multipliers to zero when using an orthogonal polynomial expansion function:

$$c_0 = \frac{ea}{n} \qquad (28)$$

where
$C_0$ = value of first weight multiplier;
a = actual target value of output nodes;
e = percentage of target value achieved;
n = number of input nodes.

15. An artificial neural network architecture comprising:

a plurality of input terminals adapted to receive n input data signals corresponding to an input pattern to be learned by said network;

each said input terminal being connected to a set of N arithmetic and storage units, said arithmetic and storage units being capable of producing the first N terms of using either an orthogonal polynomial expansion function or an orthogonal expansion function as a function of said input data signals;

a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;

means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;

a comparitor and error generator adapted to receive m said activation values from m said output nodes and compare said activation values from predetermined target values initially ascribed to said output nodes to generate m error signals;

said weight changer adapted to receive m said error signals from said comparitor and error generator to determine how much a particular signal from said weight changer is to be changed to minimize said error signals, said weight changer thereafter sending an output signal to said weight multiplier during a learning process of the network;

an input multiplexer separate from said artificial neural network architecture connected between said N arithmetic and storage units and said input terminals;

an output multiplexer connected between said output nodes and said means for adding;

wherein said sets of arithmetic and storage units generate the first N terms of either an orthogonal expansion function or an orthogonal polynomial expansion function as a function of said input data signal by placing at each of said arithmetic and storage units a term of said expansion function, and output signals of said weight changers being set to correspond to the first N coefficients of said expansion function; and, each of said output nodes are assigned the same target value and said learning is achieved by training each said output node only with a set of said input data signals associated with that particular output node and, thereby, decoupling said output nodes from each other so that when a new class of input data signals are to be identified, said network will be trained only for that class.

16. An artificial neural network architecture comprising:

a plurality of input terminals adapted to receive n input data signals corresponding to an input pattern to be learned by said network;

each said input terminal being connected to a set of N arithmetic and storage units, said arithmetic and storage units being capable of producing the first N terms of either an orthogonal polynomial expansion function or an orthogonal expansion function as a function of said input data signals;

a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;

means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;

a comparitor and error generator adapted to receive m said activation values from m said output nodes and compare said activation values from predetermined target values initially ascribed to said output nodes to generate m error signals;

said weight changer adapted to receive m said error signals from said comparitor and error generator to determine how much a particular signal from said weight changer is to be changed to minimize said error signals, said weight changer thereafter sending an output signal to said weight multiplier during a learning process of the network;

an input multiplexer separate from said artificial neural network architecture connected between said N arithmetic and storage units and said input terminals;

an output multiplexer connected between said output nodes and said means for adding;

wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, an output vector is used to identify each class of data signals corresponding to an input pattern, and said learning time is reduced by assigning through said weight initializer initial values to the output signal of a first unit of each weight multiplier in accordance with the following equation and setting the value of the output signal of all remaining weight multipliers to zero when using either an orthogonal expansion function or an orthogonal polynomial expansion function where $c_1$ and $c_2$ correspond to said output nodes with target values of $a_1 + a_2$, respectively:

$$c_1 = \left(\frac{a_1}{a_2}\right)\left(\frac{k}{n}\right)\left(\frac{-B \pm \sqrt{B^2 - 4AC}}{2A}\right) \quad (34)$$

$$c_2 = \left(\frac{k}{n}\right)\left(\frac{-B \pm \sqrt{B^2 - 4AC}}{2A}\right) \quad (35)$$

where $$A = a_1^2 + (m-1)a_2^2 \quad (36)$$

$$B = 2a_1^2 a_2 + 2(m-1)a_2^3 \quad (37)$$

$$C = a_1^2 a_2^2 + (m-1)a_2^4 - m a_1^2 a_2^2 (1-e)^2 \quad (38)$$

$k = 2^{0.5}$ if orthogonal functions used;
$k = 1$ if orthogonal polynomials are used;
$n$ = number of input terminals;
$e$ = percentage of activation to be achieved before training;
$a_1$ = target value associated with coefficient $c_1$;
$a_2$ = target value associated with coefficient $c_2$.

17. An artificial neural network architecture comprising:

a plurality of input terminals adapted to receive n input data signals corresponding to an input pattern to be learned by said network;

each said input terminal being connected to a set of N arithmetic and storage units, said arithmetic and storage units being capable of producing the first N terms of either an orthogonal polynomial expansion function or an orthogonal expansion function as a function of said input data signals;

a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;

means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;

a comparitor and error generator adapted to receive m said activation values from m said output nodes and compare said activation values from predetermined target values initially ascribed to said output nodes to generate m error signals;

said weight changer adapted to receive m said error signals from said comparitor and error generator to determine how much a particular signal from said weight changer is to be changed to minimize said error signals, said weight changer thereafter sending an output signal to said weight multiplier during a learning process of the network;

an input multiplexer separate from said artificial neural network architecture connected between said N arithmetic and storage units and said input terminals;

an output multiplexer connected between said output nodes and said means for adding;

wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, m components of said output signals form an output vector corresponding to a set of input data signals comprising a class, said m components being assigned to m said output nodes and said network learning process is achieved by training said m output nodes with said class of input data signals.

18. An artificial neural network architecture comprising:

a plurality of input terminals adapted to receive n input data signals corresponding to an input pattern to be learned by said network;

each said input terminal being connected to a set of N arithmetic and storage units, said arithmetic and storage units being capable of producing the first N terms of either an orthogonal polynomial expansion function or an orthogonal expansion function as a function of said input data signals;

a set of N weight multipliers connected on one side to said arithmetic and storage units and on the other to a weight changer and a weight initializer, each said weight multiplier for generating a weight multiplier output signal consisting of products of output signal from each set of said N arithmetic and storage units, said weight changer and said weight initializer;

means for adding connected on one side to (n) (N) said weight multipliers and on the other to m output nodes so as to generate activation values at each of said m output nodes by summing N said weight multiplier output signals received from N said weight multipliers and without using said sum as an argument of a nonlinear function;

a comparitor and error generator adapted to receive m said activation values from m said output nodes and compare said activation values from predetermined target values initially ascribed to said output nodes to generate m error signal;

said weight changer adapted to receive m said error signals from said comparitor and error generator to determine how much a particular signal from said weight changer is to be changed to minimize said error signals, said weight changer thereafter sending an output signal to said weight multiplier during a learning process of the network;

an input multiplexer separate from said artificial neural network architecture connected between said N arithmetic and storage units and said input terminals;

an output multiplexer connected between said output nodes and said means for adding;

wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function, thereby creating a single-layer neural network having (n) (N) virtual input nodes and m said output nodes that do not use nonlinear functions and, thereby, free said neural network from the problems of local minima; and, all output nodes are assigned an identical target value, and further wherein during training of said artificial neural network said arithmetic and storage units process all said input data signals associated with a first output node, store said processed data in memory, and start said training process for said first output node, and thereafter said arithmetic and storage units process and store input data associated with a second output node, and processed signals of all remaining (m−2) output nodes are generated and stored.

19. A neural network test apparatus comprising:

a plurality of input terminal means for receiving n input data signals corresponding to an input pattern to be identified by said network;

each said input terminal means being connected to a set of N arithmetic and storage units, said arithmetic and storage units capable of producing the first N terms of either an orthogonal polynomial expansion function or an orthogonal expansion function as a function of said input data signal;

said arithmetic and storage units are in turn connected to N weight multipliers said weight multipliers using synaptic link value signals generated in a previous learning process of an artificial neural network architecture, adapted to generate products of output signals from said arithmetic and storage units and said synaptic link value signals;

means for adding connected on one side to (n) (N) said weight multipliers and on the other to m output nodes so as to generate activation values at each of said m output nodes by generating sums of said products of output signals and without using said sums as an argument of a non-linear function;

a comparitor and error generator adapted to receive said activation values from m said output nodes and compare said activation values to predetermined target values initially ascribed to said m output nodes during training of said neural network to generate a set of m error signals;

said comparitor and error generator for comparing said error signals and selecting the output node which generates the smallest error signal, and identifying said input pattern with a class associated with said output node which generates the smallest error signal.

20. The artificial neural network architecture of claim 19, wherein said artificial neural network architecture is embodied on a computer chip.

21. The neural network test apparatus of claim 19, wherein said artificial neural network architecture is embodied on a hardware unit.

22. The neural network test apparatus of claim 19, wherein testing is carried out by simulation of hardware implementation of the neural network on a computer.

23. An artificial neural network architecture comprising:
- means for receiving a plurality of input data signals representing an input pattern;
- a neural network test unit connected to said means for receiving, said neural network test unit comprising:
- a plurality of input terminals for receiving n input data signals corresponding to an input pattern to be identified by said network;
- each said input terminals being connected to a set of N arithmetic and storage units, said arithmetic and storage units capable of producing the first N terms of either an orthogonal polynomial expansion function or an orthogonal expansion function as a function of said input data signals;
- said arithmetic and storage units are in turn connected to N weight multipliers said weight multipliers using synaptic link value signals generated in a previous learning process of said artificial neural network architecture, adapted to generate products of output signals from said arithmetic and storage units and said synaptic link value signals;
- means for adding connected on one side to (n.N) said weight multipliers and on the other to m output nodes so as to generate activation values at each of said m output nodes by generating sums of said products of output signals and without using said sums as an argument of the non-linear function;
- a comparitor and error generator adapted to receive said activation values from m said output nodes and subtract said activation values from predetermined target values initially ascribed to said m output nodes during training of said neural network to generate a set of m error signals;
- said comparitor and error generator for comparing said error signals and selecting the output node which generates the smallest error signal, and identifying said input pattern with a class associated with said output node which generates the smallest error signal;
- means for providing an output of said neural network test unit to a user based on synaptic link information obtained in a previous learning process of said artificial neural network;
- means for monitoring said input data signals and the output of said neural network test unit connected between said means for providing receiving a plurality of input data signals and said neural network test unit;
- a neural network learning unit connected to said means for monitoring;
- memory means for storing information loaded with said synaptic link information connected to said neural network learning unit and to said neural network test unit.

24. The artificial neural network architecture of claim 23, wherein weights of said weight multipliers are variable to provide a known output activation at each of said m output nodes based upon a known input data signal at each said input terminal, said weights of said weight multipliers being adjustable by a means for changing said weights in proportion to the difference between said activation value at each said output node and a target value assigned to each said output node, which difference is considered to be minimized at said output node which corresponds to a response which said neural network learned to provide, said weights of said weight changers which gave rise to said response being stored in said memory means for storing information.

25. The artificial neural network architecture of claim 23, further comprising:
- a means for transferring information corresponding to said synaptic link value signals to said weight changer to allow mapping of said input data signals from said input terminal means to said output nodes and to also, selectively, allow mapping of output node activation values from said output nodes, in reverse, to said input terminal means to determine which said input data signals create an erroneous output node activation value.

26. The neural network apparatus of claim 23, wherein said neural network test unit means identifies an input pattern by recognizing any larger than allowed error measure signal as an unknown input pattern and informs said means for monitoring by storing data in a results file to be obtained and read by said means for monitoring, and further wherein said monitor instructs said training program means of said artificial neural network to teach an (m+1)th output node said unknown input pattern without teaching all other patterns that said artificial neural network architecture has already learned, and generates a new set of said synaptic link value signals to be stored in said means for storing information so that said neural network test unit means using said synaptic link value signals in said weight changer can, thereafter, identify said unknown input pattern by generating a minimum error in said (m+1)th output node.

27. An artificial neural network architecture comprising:
- a plurality of input terminals adapted to receive n input data signals corresponding to an input pattern to be learned by said network;
- each said input terminal being connected to a set of N arithmetic and storage units, said arithmetic and storage units being capable of producing the first N terms of either an orthogonal polynomial expansion function or an orthogonal expansion function as a function of said input data signals;
- a set of N weight multipliers connected on one side to said arithmetic and storage units and on the other to a weight changer and a weight initializer, each said weight multiplier for generating a weight multiplier output signal consisting of products of output signals from each set of said N arithmetic and storage units, said weight changer and said weight initializer;
- means for adding connected on one side to (n) (N) said weight multipliers and on the other to m output nodes so as to generate activation values at each of said m output nodes by summing N said weight multiplier output signal received from N said weight multipliers and without using said sum as an argument of a nonlinear function;
- a comparitor and error generator adapted to receive m said activation values from m said output nodes and compare said activation values from predetermined target values initially ascribed to said output nodes to generate m error signals;

said weight changer adapted to receive m said error signals from said comparitor and error generator to determine how much a particular signal from said weight changer is to be changed to minimize said error signals, said weight changer thereafter sending an output signal to said weight multiplier during a learning process of the network;

an input multiplexer separate from said artificial neural network architecture connected between said N arithmetic and storage units and said input terminals;

an output multiplexer connected between said output nodes and said means for adding;

wherein said sets of arithmetic and storage units generate the first N terms of either an orthogonal expansion function or an orthogonal polynomial expansion function as a function of said input data signals by placing at each of said arithmetic and storage units a term of said expansion function, and output signals of said weight changers being set to correspond to the first N coefficients of said expansion function; and, the number of input terminals is the same as the number of output nodes, and each output node is connected to a corresponding input terminal, further wherein the input data signal at any one of said input terminals is assigned to a correspondingly numbered input terminal, and consequent learning time of said artificial neural network architecture is reduced by equally distributing between n sets of said weight multipliers between 50% and 97% of said input data signal connected to said output node multipled by $2^{0.5}$, as an initial value of said weights of the first unit of each set of N said weight multiplier associated with said output node, and setting the remaining (N−1) weights of each said N said weight multiplier to zero when using orthogonal functions as follows:

$$c_{i1} = (ex_i 2^{0.5})/n \tag{39}$$

e = % of the input data signal used as target value;
$x_i$ = input data signal at the i'th input node;
$c_{i1}$ = coefficient when using orthogonal functions.

28. The artificial neural network architecture of claim 27, wherein the number of input terminals is the same as the number of output nodes, and each output node is connected to a corresponding input terminal, further wherein the input data signal at any one of said input terminals is assigned to a correspondingly numbered input terminal, and consequent learning time of said artificial neural network architecture is reduced by equally distributing between n sets of said weight multipliers between 90% and 97% of said input data signal connected to said output node multiplied by $2^{0.5}$, as an initial value of said weights of the first unit of each set of N said weight multiplier means associated with said output node, and setting the remaining (N−1) weights of each said N said weight multiplier means to zero when using orthogonal polynomials:

$$c_{i0} = ex_i/n \tag{40}$$

e = % of the input data signal used as target value;
$x_i$ = input data signal at the i'th input node;
$c_{i0}$ = coefficient when using orthogonal polynomials.

29. The artificial neural network architecture of claim 28, wherein said network architecture is embodied on a computer chip.

30. The artificial neural network architecture of claim 28, wherein said network architecture is embodied on a hardware unit.

31. The artificial neural network architecture of claim 28, wherein the described functions are performed by simulation of hardware implementation of parallel distributed processing on a computer.

32. The artificial neural network architecture of claim 27, wherein said network architecture is embodied on a computer chip.

33. The artificial neural network architecture of claim 27, wherein said network architecture is embodied on a hardware unit.

34. The artificial neural network architecture of claim 27, wherein the described functions are performed by simulation of hardware implementation of parallel distributed processing on a computer.

35. A damaged symbol identification system comprised of an auto-associative neural network as defined by claim 27, and a pattern associative neural network, said pattern associative network comprising:

means for receiving a plurality of input data signals representing an input pattern;

a neural network test unit connected to said means for receiving, said neural network test unit comprising:

a plurality of input terminals for receiving n input data signals corresponding to an input pattern to be identified by said network;

each said input terminals being connected to a set of N arithmetic and storage units, said arithmetic and storage units capable of producing the first N terms of either an orthogonal polynomial expansion function or an orthogonal expansion function as a function of said input data signals;

said arithmetic and storage units are in turn connected to N weight multipliers said weight multipliers using synaptic link value signals generated in a previous learning process of said artificial neural network architecture, adapted to generate products of output signals from said arithmetic and storage units and said synaptic link value signals;

means for adding connected on one side to (n.N) said weight multipliers and on the other to m output nodes so as to generate activation values at each of said m output nodes by generating sums of said products of output signals and without using said sums as an argument of the non-linear function;

a comparitor and error generator adapted to receive said activation values from m said output nodes and subtract said activation values from predetermined target values initially ascribed to said m output nodes during training of said neural network to generate a set of m error signals;

said comparitor and error generator for comparing said error signals and selecting the output node which generates the smallest error signal, and identifying said input pattern with a class associated with said output node which generates the smallest error signal;

means for providing an output of said neural network test unit means to a user based on synaptic link information obtained in a previous learning process of said artificial neural network;

means for monitoring said input data signals and the output of said neural network test unit means connected between said means for providing receiving a plurality of input data signals and said neural network test unit means;

a neural network learning unit connected to said means for monitoring;

memory means for storing information loaded with said synaptic link information connected to said neural network learning unit and to said neural network test unit means; wherein the auto-associative network learns in real-time the undamaged symbols so that after said learning process said system can restore missing features of a damaged symbol, and allow the pattern associative neural network to identify the damaged symbol using its restored features when at least one half of the information about each of its said missing features survived the damage.

36. The damaged symbol identification system of claim 35, wherein the appearance of a previously unknown symbol causes said auto-associative neural network to learn in real-time, without retraining previously trained output nodes, so that the damaged versions of the new symbol can be restored, and subsequently identified, by the pattern associative neural network.

37. An artificial neural network architecture having the ability to learn patterns in real time, comprising:

means for providing input data signals to said neural network corresponding to a pattern, said means for providing connected to a neural network test unit;

said means for providing input data signals and said artificial neural network test unit connected to a means for monitoring m output signals from m corresponding neural network test unit output nodes;

said means for monitoring connected to a neural network training unit;

said means for monitoring connected to a means for inputting a signal representing an actual outcome;

said neural network training unit connected to a means for storing information and to said neural network test unit;

wherein if an unknown set of signals is received from said means for providing by said monitor, said unknown set of signals is stored in said means for storing information and a first $(m+1)^{th}$ output node is added to said neural network training unit and trained in said neural network training unit with said unknown set of signals without retraining any previously trained output nodes, and a second $(m+1)^{th}$ output node is added to said neural network test unit, and a synaptic link value associated with said first $(m+1)^{th}$ output node is incorporated into said neural network test unit in association with only said second $(m+1)^{th}$ output node.

38. An artificial neural network as in claim 37, further comprising a means for providing an output in human perceptible form connected to said neural network test unit.

* * * * *